(12) United States Patent
Cao et al.

(10) Patent No.: US 8,978,119 B2
(45) Date of Patent: Mar. 10, 2015

(54) AUTOMATIC TRANSFER OF CREDENTIALS BETWEEN WIRELESS ACCESS POINTS

(71) Applicant: Sierra Wireless, Inc., Richmond (CA)

(72) Inventors: James Cao, Vancouver (CA); Mikio-Yves Matsuo, Vancouver (CA)

(73) Assignee: Sierra Wireless, Inc., Richmond (CA)

( * ) Notice: Subject to any disclaimer, the term of this patent is extended or adjusted under 35 U.S.C. 154(b) by 0 days.

(21) Appl. No.: 13/782,918

(22) Filed: Mar. 1, 2013

(65) Prior Publication Data
US 2014/0250513 A1    Sep. 4, 2014

(51) Int. Cl.
*H04L 29/06*    (2006.01)

(52) U.S. Cl.
CPC ..................... *H04L 63/08* (2013.01)
USPC ............................................................ 726/7

(58) Field of Classification Search
None
See application file for complete search history.

(56) References Cited

U.S. PATENT DOCUMENTS

| | | | |
|---|---|---|---|
| 7,522,906 B2* | 4/2009 | Whelan et al. ................ | 455/411 |
| 7,548,744 B2* | 6/2009 | Oesterling et al. ............ | 455/411 |
| 7,551,577 B2* | 6/2009 | McRae ........................... | 370/328 |
| 7,603,119 B1* | 10/2009 | Durig et al. ................. | 455/432.3 |
| 8,040,858 B2* | 10/2011 | Muhamed et al. ............ | 370/338 |
| 8,549,588 B2* | 10/2013 | Wynn et al. ....................... | 726/5 |
| 2006/0236105 A1* | 10/2006 | Brok et al. ..................... | 713/169 |
| 2008/0165735 A1* | 7/2008 | Chen et al. ..................... | 370/331 |
| 2009/0109941 A1* | 4/2009 | Carter .......................... | 370/338 |
| 2012/0116886 A1* | 5/2012 | Manku ....................... | 705/14.64 |
| 2013/0347073 A1* | 12/2013 | Bryksa et al. ..................... | 726/4 |

OTHER PUBLICATIONS

Sierra Wireless—AirCard 802S Desktop Cradle.
Sierra Wireless—AirCard Hub.
MiFi E586 Review.
Sierra Wireless—News Release AirCard.

\* cited by examiner

*Primary Examiner* — Jeffrey Pwu
*Assistant Examiner* — Wasika Nipa
(74) *Attorney, Agent, or Firm* — DLA Piper LLP (US)

(57) ABSTRACT

A system and method for transferring configuration information between wireless access points is provided. Configuration information may include SSID and password, but also certain settings such as network and subnetwork settings. A first wireless access point may be a mobile hotspot, and a second wireless access point may be a docking station. The first wireless access point is initially active and operating using certain configuration information. Upon a trigger event such as a docking or undocking event, the configuration information is transferred to the second wireless access point. The first wireless access point ceases using the transferred configuration information, for example by switching off or adjusting its configuration, and the second wireless access point begins using the transferred configuration information. The configuration information may be transferred back upon a second trigger event.

16 Claims, 6 Drawing Sheets

AUTOMATIC TRANSFER OF CREDENTIALS BETWEEN WIRELESS ACCESS POINTS

FIELD OF THE TECHNOLOGY

The present technology pertains in general to management of network devices and in particular to automated configuration of wireless access points.

BACKGROUND

Wireless access points are ubiquitous technology for providing network connectivity to a variety of electronic client devices. A typical wireless access point sits between client devices and a broader network, such as a wired or wireless wide-area network (WAN), cellular packet data network, the Internet, or a combination thereof. Client devices communicate with the wireless access point via a wireless protocol such as IEEE 802.11, while the wireless access point communicates with the broader network via a wired or wireless connection, possibly via an integrated or external router. A mobile hotspot is a type of wireless access point which utilizes a wireless connection such as a cellular connection or other wireless WAN connection for access to the broader network, and which is potentially mobile, for example carried with a user.

A client device may store the service set identifier (SSID), security protocol and password associated with a preferred wireless access point. When any wireless access point having the matching SSID, security protocol and password parameters comes within range, the client device will automatically connect to that wireless access point. Security protocols include Wired Equivalent Privacy (WEP) and Wi-Fi Protected Access (WPA, WPA2). Therefore, if two wireless access points are configured having the same SSID, security protocol and password, an appropriately configured client device will automatically connect to either wireless access point when within range. However, it is not straightforward to trigger the client device to disconnect from one of the two wireless access points and connect to the other if both wireless access points are within range. In addition, if the SSID, security protocol or password of one of the wireless access points is changed, the client device may no longer automatically connect to that wireless access point without adjustment. Similarly, if the SSID, security protocol or password of one of the wireless access points is changed and the client device is updated with the changed information, then the client device may not be able to connect to the remaining wireless access point, or the wireless access points will have different SSIDs, or both.

Mobile hotspots facilitate network connectivity without the same mobility constraints as wired hotspots. However, mobile hotspots which are not connected to an external power source typically have limited battery power, and may also suffer from internally defined limits on their data rates, for example due to architectural limitations. It may therefore be desirable to offload at least the access point functionality of a mobile hotspot to another device when possible. However, this typically requires manual intervention at an appropriate time in order to disconnect from one access point and trigger automatic connection to the other.

Therefore there is a need for a method and apparatus to facilitate automatic transfer of credentials between wireless access points that is not subject to one or more limitations of the prior art.

This background information is provided for the purpose of making known information believed by the applicant to be of possible relevance to the present technology. No admission is necessarily intended, nor should be construed, that any of the preceding information constitutes prior art against the present technology.

SUMMARY

An object of the present technology is to provide a method and apparatus for facilitating automatic transfer of credentials between wireless access points. In accordance with an aspect of the present technology, there is provided a system comprising a first wireless access point and a second wireless access point, each of the wireless access points operable for communication with one or more wireless devices via a local wireless network, the first wireless access point initially utilizing predetermined identity and authentication credentials, the system configured, in response to a predetermined trigger event, to transfer the identity and authentication credentials from the first wireless access point to the second wireless access point, wherein upon transferring the identity and authentication credentials, the first wireless access point is configured to cease using the identity and authentication credentials, and the second wireless access point is configured to begin using the identity and authentication credentials.

In accordance with another aspect of the present technology, there is provided a system comprising a first wireless access point and a second wireless access point, each of the wireless access points operable for communication with one or more wireless devices via a local wireless network, the first wireless access point comprising: a first trigger monitoring module configured to monitor for one or more predetermined trigger events; a first operation adjustment module configured to cause the first wireless access point to cease using a currently used set of identity and authentication credentials in operation upon detection of a first one of the predetermined trigger events; and a first credential communication module configured to transmit said set of identity and authentication credentials to the second wireless access point upon detection of the first one of the predetermined trigger events; and the second wireless access point comprising: a second credential communication module configured to receive said set of identity and authentication credentials from the first credential communication module; and a second operation adjustment module configured to cause the second wireless access point to begin using a currently used set of identity and authentication credentials in operation upon receipt of said set of identity and authentication credentials.

In accordance with another aspect of the present technology, there is provided a method for operating a first wireless access point in conjunction with a second wireless access point, each of the wireless access points operable for communication with one or more wireless devices via a local wireless network, the first wireless access point initially utilizing predetermined identity and authentication credentials, the method comprising: detecting a predetermined trigger event at one or both of the first wireless access point and the second wireless access point; in response to a predetermined trigger event, transferring the identity and authentication credentials from the first wireless access point to the second wireless access point; and upon transferring the identity and authentication credentials, ceasing use of the identity and authentication credentials by the first wireless access point and beginning use of the identity and authentication credentials by the second wireless access point.

In accordance with an aspect of the present technology, there is provided a computer-program product embedded on a computer readable medium, the computer program product comprising code, which when loaded into memory and executed on an associated processor, is adapted to direct a set of operations of a first wireless access point and a second wireless access point, each of the wireless access points operable for communication with one or more wireless devices via a local wireless network, the first wireless access point initially utilizing predetermined identity and authentication credentials, the set of operations comprising: detecting a predetermined trigger event at one or both of the first wireless access point and the second wireless access point; in response to a predetermined trigger event, transferring the identity and authentication credentials from the first wireless access point to the second wireless access point; and upon transferring the identity and authentication credentials, ceasing use of the identity and authentication credentials by the first wireless access point and beginning use of the identity and authentication credentials by the second wireless access point.

BRIEF DESCRIPTION OF THE FIGURES

These and other features of the technology will become more apparent in the following detailed description in which reference is made to the appended drawings.

DETAILED DESCRIPTION

Definitions

As used herein, the term "about" refers to a +/−10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this technology belongs.

An aspect of the present technology provides a system comprising a first wireless access point and a second wireless access point. In various embodiments, the first wireless access point may be a mobile hotspot, and the second wireless access point may be associated with, for example embedded into, a docking station for the mobile hotspot. The first wireless access point is initially active and using a predetermined set of identity and authentication credentials, referred to below as the "original credentials," for convenience. This set may include an SSID, encryption protocol and password, for example. In response to a predetermined trigger event, the system is configured to communicate the original credentials from the first wireless access point to the second wireless access point. The system is further configured to cause the first wireless access point to cease using the original credentials, and to cause the second wireless access point to begin using the original credentials.

In some embodiments, "identity and authentication credentials" may be broadly interpreted to include configuration information which is transferable between wireless access points. Such configuration information may include SSID, encryption protocols and/or passwords, but may additionally or alternatively include other information such as network settings, subnetwork settings, DHCP settings, device configuration settings, and the like. Therefore, phrases such as "credentials" or "identity and authentication credentials" may be replaced with phrases such as "configuration information" herein.

For example, in some embodiments, the first wireless access point is initially active and using a predetermined set of configuration information. In response to a predetermined trigger event, the system is configured to communicate at least a portion of this configuration information from the first wireless access point to the second wireless access point. The system is further configured to cause the first wireless access point to cease using at least a portion of the communicated configuration information, and to cause the second wireless access point to begin using at least a portion of the communicated configuration information.

The configuration information may be characterized in that it is advantageous that the configuration information at each hotspot is different in at least one aspect. Identities such as SSID exemplify this, since it is advantageous to be able to distinguish one hotspot from another by referencing hotspot identities. It is noted that ceasing to use a certain set of credentials or configuration information may be achieved by ceasing to use only part of that set, since a change in one member of the set implies a change to the set as a whole. Thus, for example, changing an SSID but leaving a password unchanged may correspond to ceasing to use a SSID/password combination.

In some embodiments, "identity and authentication credentials" may be interpreted as configuration information which is specific to device identification, login and/or authentication information. Such configuration information may include SSID, encryption protocol and/or passwords.

As a result, a client device, which is connected to the first wireless access point (e.g. the mobile hotspot) before the trigger event, will be unable to connect to the first wireless access point using the original credentials after the trigger event, since the first wireless access point is no longer using those original credentials. However, since the second wireless access point (e.g. the docking station) begins using the original credentials, it is anticipated that the client device will automatically connect to that wireless access point. This facilitates an automatic and potentially streamlined transfer of client devices from the first wireless access point to the second wireless access point. Thus, the system enables transition of connectivity between the first wireless access point and the second wireless access point.

In some embodiments, when the first wireless access point is a mobile hotspot and the second wireless access point is associated with a docking station, the trigger event corresponds to docking of the mobile hotspot with the docking station. In some embodiments, the predetermined trigger event more generally corresponds to bringing the first wireless access point within a predetermined distance of the second wireless access point. Distance or proximity may be measured in various ways, for example using wireless signal strength measurements or GPS measurements.

In some embodiments, causing the first wireless access point to cease using the original credentials may comprise deactivating the first wireless access point, at least insofar as it operates as a wireless access point. Such embodiments are associated with Modes "A" and "B" as discussed further below. In other embodiments, causing the first wireless access point to cease using the original credentials may comprise allowing the first wireless point to remain active, but changing its identity and authentication credentials to differ from the original credentials. Such embodiments are associated with Modes "C" and "D" as discussed further below. In some embodiments, the new identity and authentication credentials correspond to a slightly adjusted version of the original credentials. In another embodiment, and if applicable, the new identity and authentication credentials may be credentials acquired from the second wireless access point. This may correspond to an optional "credential swap" operation associated with Mode "D."

In some embodiments, the second wireless access point is configured to automatically activate if it is not activated upon receipt of the original credentials. Otherwise, it is configured to adjust its identity and authentication credentials to correspond with the original credentials, as necessary.

In various embodiments of the present technology, the system is configured to further adjust the operation of one or both of the first wireless access point and the second wireless access point in response to a second predetermined trigger event. In some embodiments, when the first wireless access point is a mobile hotspot and the second wireless access point is associated with a docking station, the second trigger event corresponds to undocking of the mobile hotspot from the docking station. In some embodiments, the second trigger event more generally corresponds to separating the first wireless access point from the second wireless access point by a predetermined distance.

In response to this second trigger event, the system may be configured to cause the first wireless access point (for example the mobile hotspot) to resume operation using the original credentials. If the first wireless access point was deactivated before the second trigger event (Modes "A" and "B"), it may be reactivated and use of the original credentials may be resumed immediately. If the first wireless access point was active but using identity and authentication credentials that are different from the original credentials (Modes "C" and "D"), the original credentials may be retrieved from memory (or possibly from the second wireless access point) and put into use.

Further in response to this second trigger event, the system may be configured to cause the second wireless access point (for example the docking station) to cease operating using the original credentials. In some embodiments, this may comprise deactivating the second wireless access point, at least insofar as it operates as a wireless access point. Such embodiments are associated with Modes "A" and "C" as discussed further below. In other embodiments, causing the second wireless access point to cease using the original credentials may comprise allowing the second wireless point to remain active, but changing its identity and authentication credentials to something other than the original credentials. Such embodiments are associated with Modes "B" and "D" as discussed further below. In some embodiments, the new identity and authentication credentials correspond to a slightly adjusted version of the original credentials. In another embodiment, and if applicable, the new identity and authentication credentials may be credentials acquired from the first wireless access point. This may correspond to an optional "credential swap" operation associated with Mode "D."

As with the first trigger event, it is anticipated that client devices that were connected to the second wireless access point before the second trigger event will "follow" the original credentials back to the first wireless access point.

In some embodiments, the first wireless access point maintains a connection, such as a wireless, cellular packet data connection, to a broader network, for example via a cellular base station. This is typically the case for a mobile hotspot configured as a cellular subscriber. The second wireless access point may not have its own connection to the broader network. Rather, the first wireless access point's connection may be maintained whether docked or undocked, and the second wireless access point may be configured to route all communications to and from the broader network through the first wireless access point. The first and second wireless access points may comprise electrically mated communication ports for this purpose. Alternatively, the first and second wireless access points may communicate wirelessly via a short-range protocol such as Wi-Fi™, Bluetooth™, Zigbee™ or other short-range protocol as would be readily understood. The second wireless access point may be a docking station in this case. An advantage of this configuration is that only one subscription to a network service provider needs to be maintained.

In other embodiments, each of the first and second wireless access points maintains its own connection to the broader network. For example, the first wireless access point may maintain a wireless, cellular packet data connection to a broader network via a cellular base station, while the second wireless access point may maintain a different wireless connection or a wired connection to the broader network via an internet service provider providing service over a coaxial cable, twisted copper pair, optical fiber connection, or the like.

Yet another aspect of the present technology provides a method for operating a first wireless access point and a second wireless access point. The first wireless access point may be a mobile hotspot, and the second wireless access point may be associated with a docking station for the mobile hotspot. The first wireless access point is initially active and using a predetermined set of "original" identity and authentication credentials. The method comprises, in response to a predetermined trigger event, communicating the original credentials from the first wireless access point to the second wireless access point. The method further comprises causing the first wireless access point to cease using the original credentials, and causing the second wireless access point to begin using the original credentials.

Yet another aspect of the present technology provides a method for operating the first wireless access point as described above, the first wireless access point being configured to interact with the second wireless access point, as also described above. In particular, the method comprises, in response to a predetermined trigger event, transmitting the original credentials from the first wireless access point to the second wireless access point. The method further comprises causing the first wireless access point to cease using the original credentials.

Yet another aspect of the present technology provides a method for operating the second wireless access point as described above, the second wireless access point being configured to interact with the first wireless access point, as also described above. In particular, the method comprises, in response to a predetermined trigger event, receiving the original credentials at the second wireless access point from the first wireless access point. The method further comprises causing the second wireless access point to begin using the original credentials.

Yet another aspect of the present technology provides a computer program product or collection of computer program products containing computer-readable instructions for automatically implementing methods such as described above.

Various embodiments of the present technology facilitate a relatively streamlined or even "seamless" handover experience between Wi-Fi access points, at least from the perspective of an end user and possibly certain applications running on the client device. Such a handover may occur from a mobile hotspot to its docking station when the hotspot is returned to its charging cradle and docked. The docking station may be configured to automatically query the mobile hotspot configuration information, for example Wi-Fi credentials such as SSID, encryption protocol, password, routing table, and the like. The docking station may then be configured to use this information as the docking station's configuration information. The client devices will then have all the information required to connect to the docking station, even if they have not encountered the docking station before.

Thus, in accordance with embodiments of the present technology, the identity and authentication credential information of the first and second wireless access points are kept closely associated with each other. This reduces the amount of reconfiguration that needs to be done if changing the identity or authentication credential information of the wireless access points. In various embodiments, the first wireless access point maintains its own settings, changeable via a web interface thereof. The second wireless access point may also maintain its own settings, or may only acquire settings from the first wireless access point when coupled thereto, depending on mode of operation.

In various embodiments, other configuration information may be transferred and applied along with the identity and authentication credential information mentioned above. Although such information may not fit the typical definition of "credentials," it may be included and transferred with other credential information and thus regarded herein as a type of credential information. In general, various configuration information may be transferred which is useful in causing the wireless access point receiving the configuration information to appear and/or behave adequately similarly to the wireless access point sending the configuration information. Depending on the implementation, this may include routing tables, NAT information, network and subnetwork configuration information, user preferences, service provider settings, and the like.

In some embodiments, the docking station may obtain information about the mobile hotspot local network subnet. The docking station may then establish a dedicated host route to the mobile hotspot to resolve the routing ambiguity produced by dealing with the same subnet on different interfaces.

In some embodiments, where the docking station applies a modified version of the mobile hotspot subnet settings, the docking station subnet may be incremented using the subnet mask. The subnet is a division of the IP network. For example, the address 192.168.1.0/24 may be incremented to 192.168.2.0/24, 10.3.255.0/24 may be incremented to 10.4.0.0/24, 10.0.0.0/16 may be incremented to 10.1.0.0/16, and the like. In other embodiments, the subnet may be decremented or numerically adjusted in another predetermined fashion.

In some embodiments, for example when the first wireless access point is a mobile hotspot, associating a second wireless access point with a docking station solves additional technical problems. For example, the mobile hotspot may have an inherent Wi-Fi throughput limitation due to firmware constraints. However, this limitation may be overcome by implementing a separate Wi-Fi circuit in the docking station and using that separate Wi-Fi circuit when the mobile hotspot is docked, instead of (or possibly in addition to) the Wi-Fi circuit of the mobile hotspot. Since the docking station does not have the same constraints (e.g. MIPs constraints) as the mobile hotspot, the docking station may be able to support greater speeds for example associated with IEEE 802.11b/g/n networks, associated MIMO antenna implementations, and the like.

In some embodiments, when the mobile hotspot is docked (and possibly with its Wi-Fi functionality turned off), the mobile hotspot may be configured to automatically display the identity and authentication credentials currently being used by the docking station.

Figure 1:
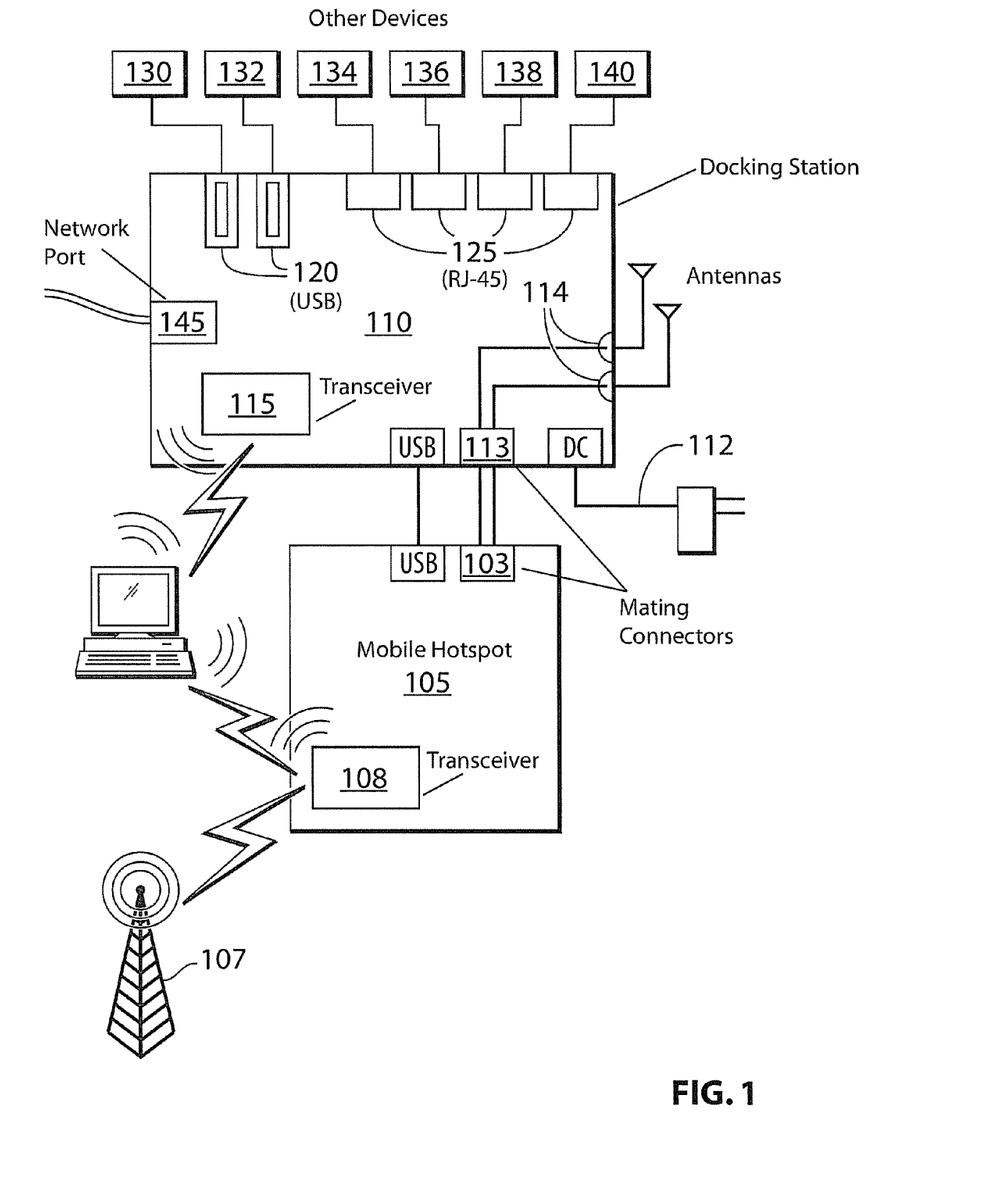
FIG. 1 illustrates a system comprising a mobile hotspot and a docking station, in accordance with one embodiment of the technology.

FIG. 1 illustrates a system comprising a mobile hotspot 105 and a docking station 110, in accordance with embodiments of the present technology. When undocked, the mobile hotspot 105 can maintain a packet data connection with a cellular base station 107, as would be readily understood by a worker skilled in the art. By way of this connection, the mobile hotspot 105 allows its client devices to connect to the Internet, for example. The mobile hotspot 105 may be coupled to the docking station 110 via a cable, a pair of direct, mating connectors, an inductive charging connection, or the like. In one example, a micro USB port may be used to provide the connection between the mobile hotspot and docking station. Once connected, the mobile hotspot battery may be charged. Information such as identity and authentication credentials may also be transferred from the mobile hotspot to the docking station in response to docking. The mobile hotspot 105 may further be configured to cease operating as a hotspot, for example by switching off its wireless transceiver 108 (for example Wi-Fi), in response to docking. The docking station 110 may further be configured to begin operating as a wireless access point, for example by switching on its wireless (for example Wi-Fi) transceiver 115, in response to docking.

In some embodiments, the mobile hotspot 105, when operating undocked, may provide data routing between 3G/4G WAN and an integrated IEEE 802.11 Wi-Fi access point. Additionally, the mobile hotspot 105 may provide a USB-based network interface to a notebook computer or similar. When docked, the mobile hotspot may, in some embodiments, provide data routing between 3G/4G WAN and the docking station.

The docking station 110 is further connected to a power source, for example by an AC adapter 112. The docking station may further comprise one or more communication ports, such as USB ports 120 and RJ-45 ports 125, for connecting to various other devices such as printers 130, memory sticks 132, network-attached storage device 134, desktop computer 136, gaming console 138 and laptop computer 140. The docking station may further comprise an RJ11 port and related hardware for operatively coupling a conventional telephone thereto. The docking station and possibly the mobile hotspot may be configured to provide voice over IP service via the RJ11 port.

In some embodiments, the docking station may further comprise a port 145 for connection to a broader network, optionally via an external router, modem or other network infrastructure equipment. The port 145 may be a wired Ethernet port, a port connecting to another wireless WAN USB device, or the like. In such embodiments, the docking station may be configured to facilitate communication between the various devices communicatively coupled therewith (via wired or wireless connection), as well as between the various devices and the broader network (WAN, for example). In some embodiments, when the mobile hotspot is undocked, the docking station may provide connectivity to the broader network via the port 145 (when connected). When the mobile hotspot is docked, the docking station may provide connectivity to the broader network via the mobile hotspot, via the port 145, or concurrently via both. The various connectivity options, prioritizations and behaviours may be user-configurable. The docking station may utilize multiple WAN connections concurrently, or it may use designated WAN connections, selected according to predetermined priority and fall-back configuration settings. For example, an alternative WAN connection available via the docking station may be configured as a fall-back for the mobile hotspot WAN connection or vice-versa.

In some embodiments, the mobile hotspot comprises one or more external RF connectors 103 which are configured to couple with mating RF connectors 113 of the docking station. The docking station comprises RF transmission lines for coupling the RF connectors 113 with internal antennas (not shown) or antenna connector ports 114. External antennas may be coupled to the antenna connector ports 114 and used to enhance connectivity between the mobile hotspot 105 and the base station 107 when the mobile hotspot is docked. In some embodiments, there may be two external RF connectors 103, two mating connectors 113, two RF transmission lines and two antennas or ports 114. This may facilitate antenna diversity and/or MIMO capabilities. The connectors 103 and 113 may correspond to mating TS-9 connectors or the like, and the antenna connector ports 114 may correspond to SMA RF connectors or the like. In some embodiments, the connectors and RF transmission lines may be configured to support communication frequencies up to about 2.5 GHz. The system may thus be configured such that the docking station provides augmented antenna capabilities for facilitating improved wireless connectivity of the mobile hotspot to the broader network.

In some embodiments, when the mobile hotspot is docked, the docking station and the mobile hotspot operate in combination to provide access to the broader network. For example, the docking station may operate as a Wi-Fi router while the mobile hotspot operates as a wide-area network (WAN) gateway coupled to the Wi-Fi router. Client devices communicate with the docking station 110 and, where it is desired to communicate with the broader network, the docking station 110 routes communications through the mobile hotspot 105 to the base station 107. Similarly, communication from the base station 107 to the client devices may be routed through the mobile hotspot 105 to the docking station 110 and from the docking station 110 to the appropriate client device. Thus, the mobile hotspot 105 provides access to the broader network both when docked and when undocked. However, when docked, the docking station 110 acts as a wireless access point, with the mobile hotspot 105 acting as an intermediate node in the connection to the broader network. In some embodiments, the docking station may provide a mount for additional antennas to be used by the mobile hotspot, thereby potentially increasing the signal-to-noise ratio between the mobile hotspot 105 and the base station 107. In some embodiments, the docking station 110 may comprise the port 145 for wired access to the broader network, but when this port 145 is disconnected, access to the broader network may be provided via the mobile hotspot 105 as described above.

FIGS. 2a to 2d illustrate operations of a mobile hotspot 200 and a docking station 205 operating in various modes, termed Modes "A," "B," "C" and "D," respectively, in accordance with embodiments of the present technology. It is understood that the mobile hotspot 200 may be replaced with a more general first wireless access point, and the docking station 205 may be more replaced with a more general second wireless access point. In addition, docking and undocking events may be more generally replaced with different but analogous trigger events, such as the wireless access points coming within a predetermined distance of each other. The mobile hotspot and docking station may be configured to operate in one of the modes by user configuration or selection.

Figure 2A:
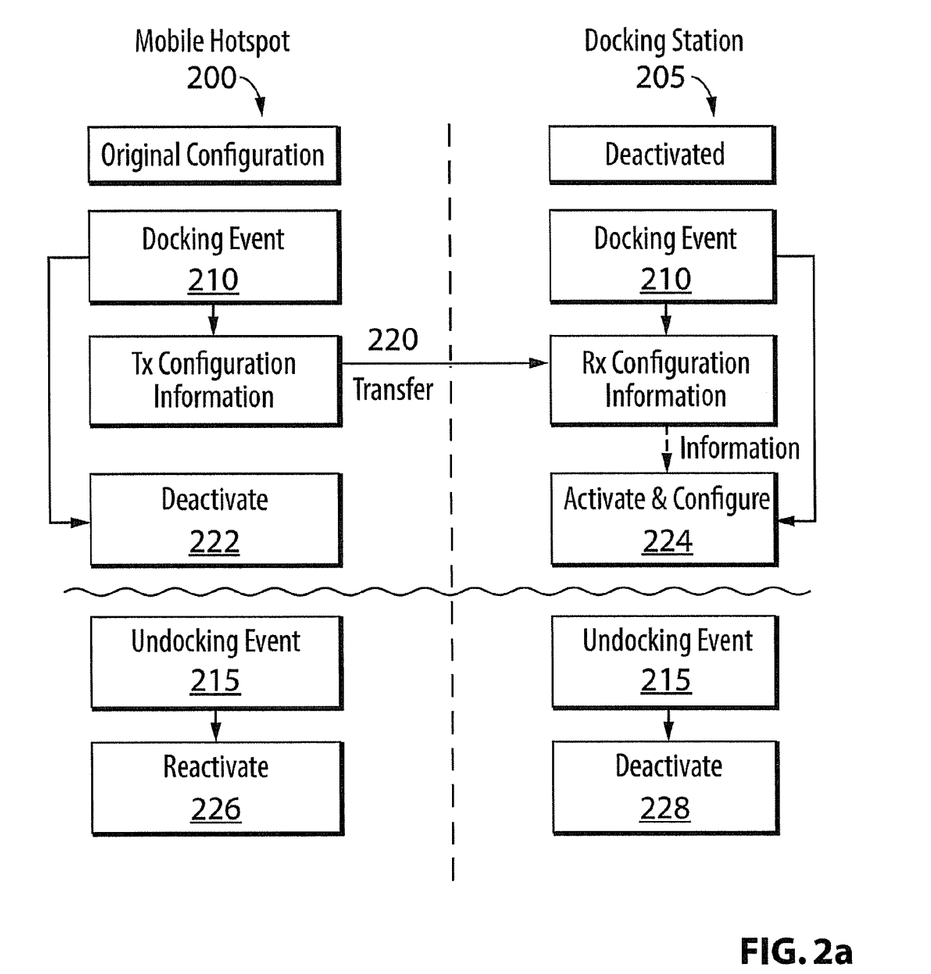
FIGS. 2a to 2d illustrates methods of operating a mobile hotspot and a docking station, in accordance with embodiments of the technology.

FIG. 2a illustrates Mode "A" operation as follows. Initially, the mobile hotspot 200 includes an original set of configuration information, such as its original credentials, and the access point communication facility of the docking station 205 may be deactivated or the access point communication facility may be operating using a different set of configuration information. An access point communication facility, as used herein, may comprise those components of a device that allow it to operate as a wireless access point, such as the Wi-Fi transceiver and associated components.

Upon occurrence of a trigger event, such as a docking event 210, the configuration information of the mobile hotspot is transferred 220 to the docking station. The transfer may be via wired communication or possibly wireless communication. The transfer may be initiated by the docking station transmitting a query to the mobile hotspot, or the mobile hotspot may initiate the transfer. Additionally following occurrence of the docking event 210, the mobile hotspot deactivates 222 its access point communication facility. Additionally following occurrence of the docking event 210, the docking station configures 224 its access point communication facility using the transferred configuration information, and the access point communication facility activates, if not already active. Upon occurrence of an undocking event 215, the mobile hotspot reactivates 226 its access point communication facility, and the docking station deactivates 228 its access point communication facility.

Figure 2B:
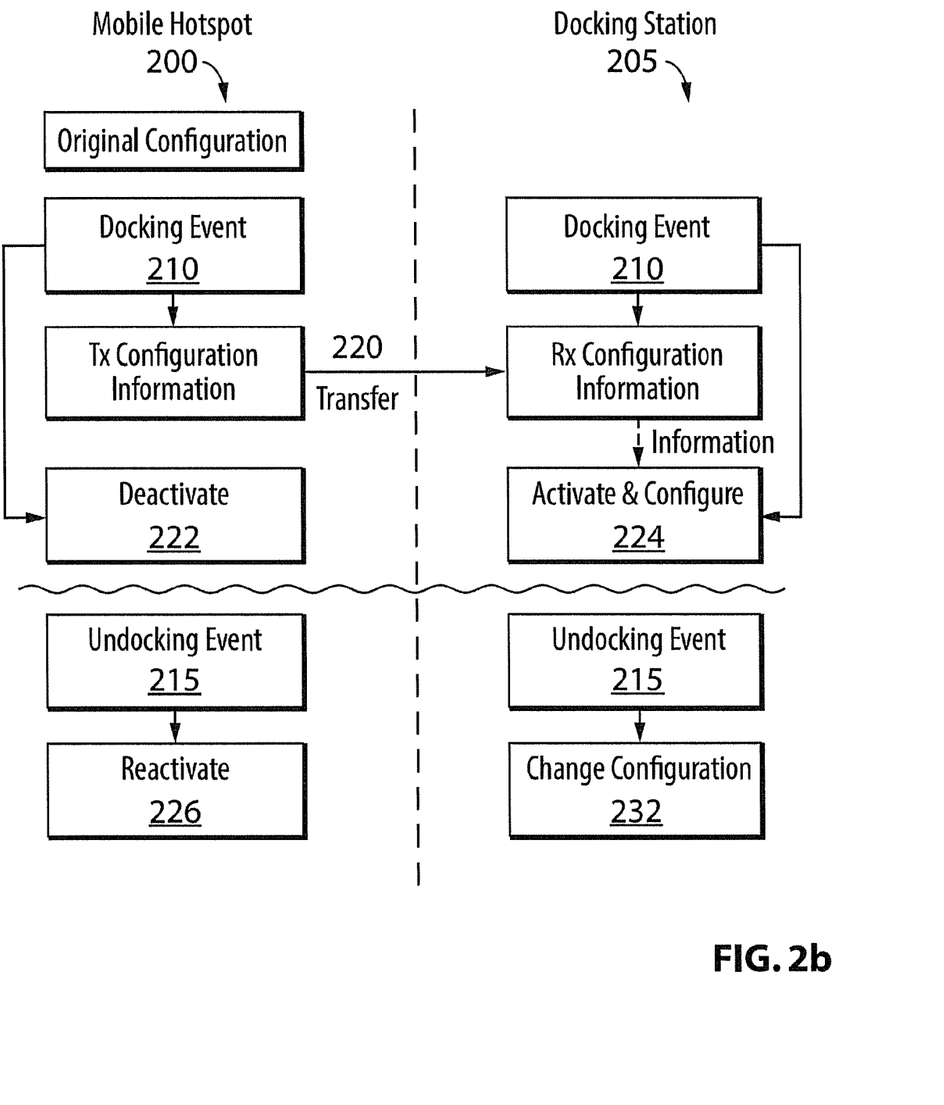

FIG. 2b illustrates Mode "B" operation. Mode "B" operation proceeds in the same manner as Mode "A" operation until the undocking event 215 occurs. At this point, the mobile hotspot reactivates 226 its access point communication facility as in Mode "A" but the docking station does not deactivate its access point communication facility. Instead, the docking station changes 232 its configuration settings, particularly its identity, such as its SSID and possibly subnet. Other configuration settings may remain the same. In some embodiments, the SSID may be adjusted by appending a suffix onto the current SSID. For example, the SSID "my-hotspot" may be adjusted to "my-hotspot-C." If there is insufficient room to append the suffix, the last few characters of the current SSID may be overwritten with the suffix. If the SSID already ends with the suffix, an alternate suffix may be used.

Figure 2C:
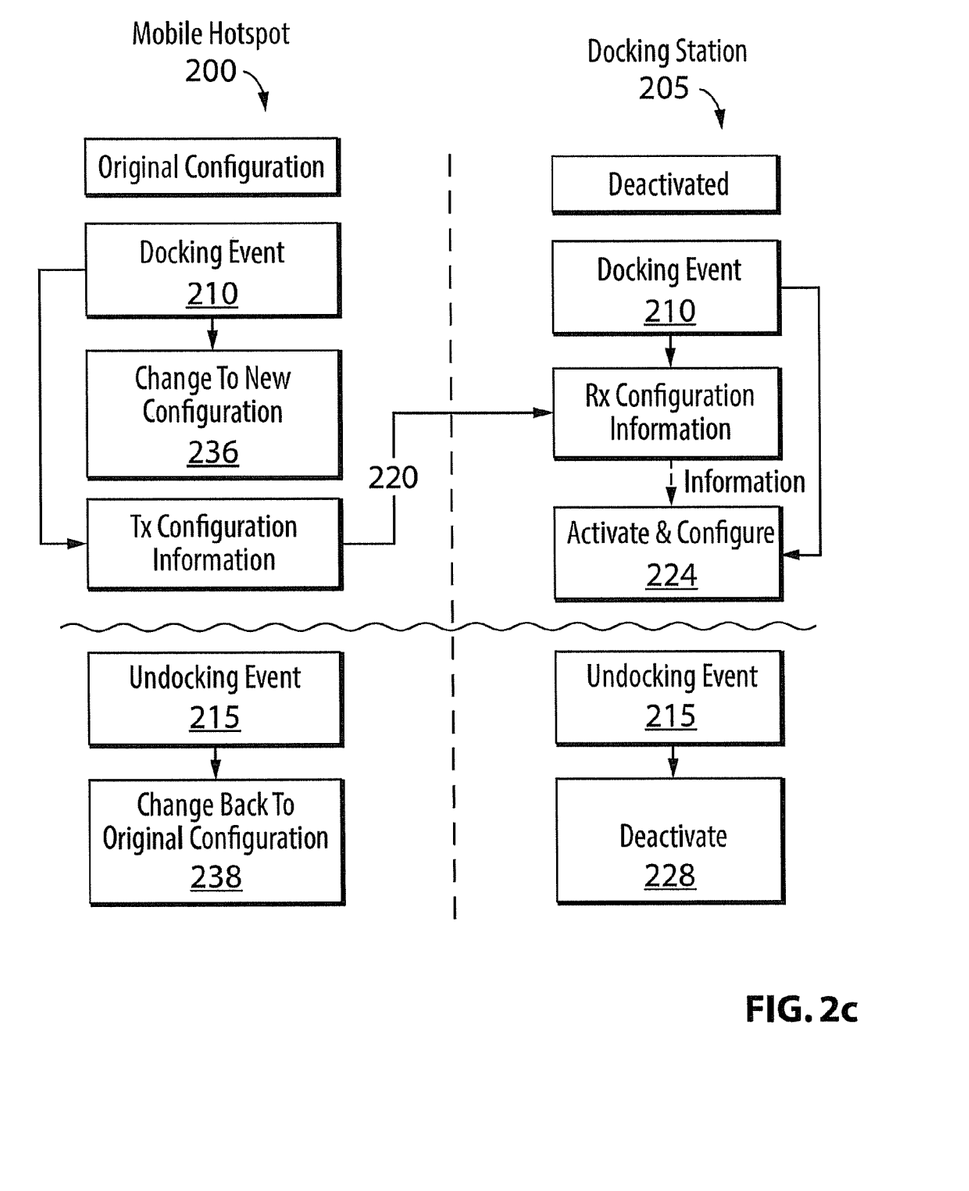

FIG. 2c illustrates Mode "C" operation. Mode "C" operation proceeds in the same manner as Mode "A" operation except that, instead of deactivating its access point communication facility upon docking and reactivating it upon undocking, the mobile hotspot 200 changes 236 at least some of its configuration settings, particularly its identity, upon docking and changes back 238 to the original configuration settings upon undocking. In some embodiments, changing 236 the mobile hotspot configuration settings may comprise adjusting its SSID, for example to append a suffix onto the current SSID. Changing back 238 of the configuration settings may then comprise removing the suffix from the current SSID.

Figure 2D:
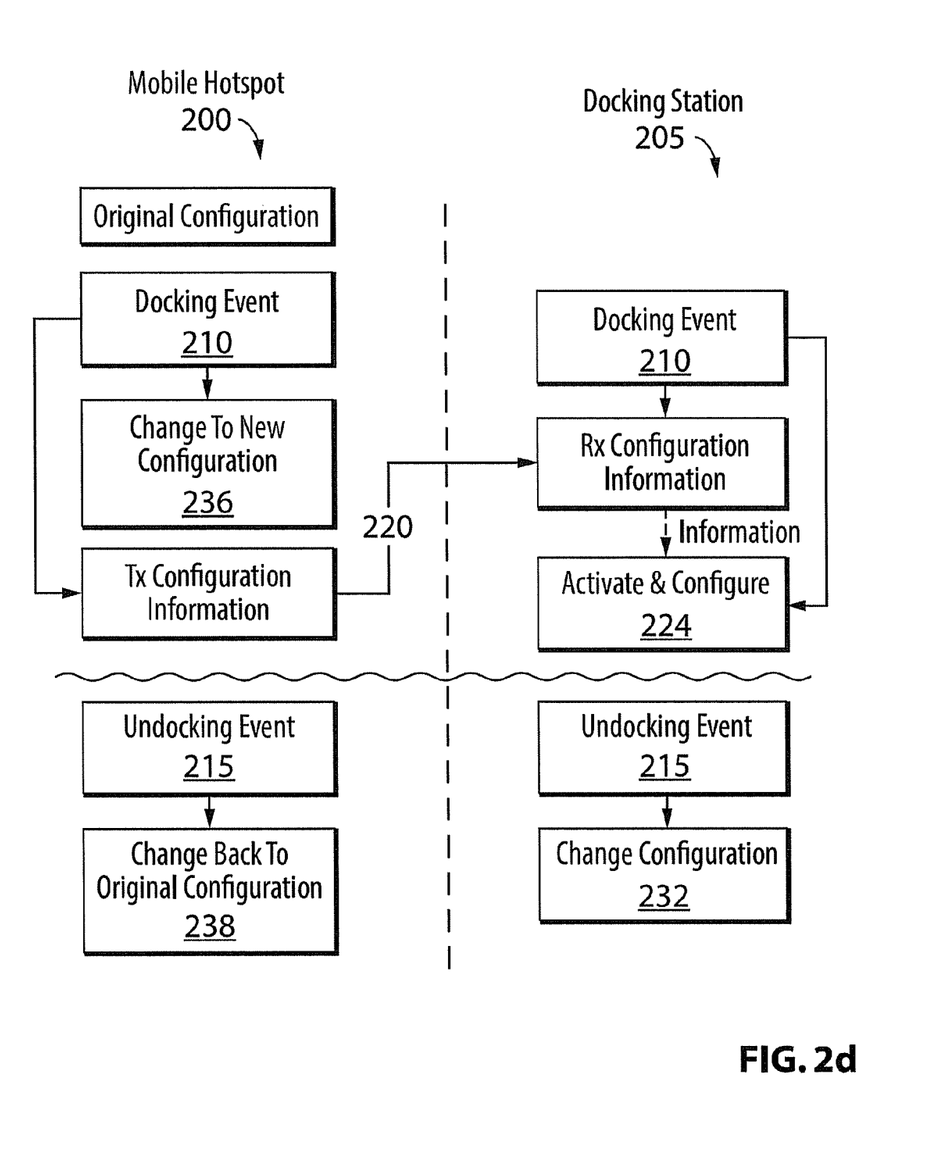

FIG. 2d illustrates Mode "D" operation. Mode "D" operation proceeds in the same manner as Mode "B" operation but including the feature, as in Mode "C" operation, that mobile hotspot 200 retains its access point communication facility as active but changes 236 its configuration settings upon docking and changes back 238 to the original configuration settings upon undocking.

Figure 3:
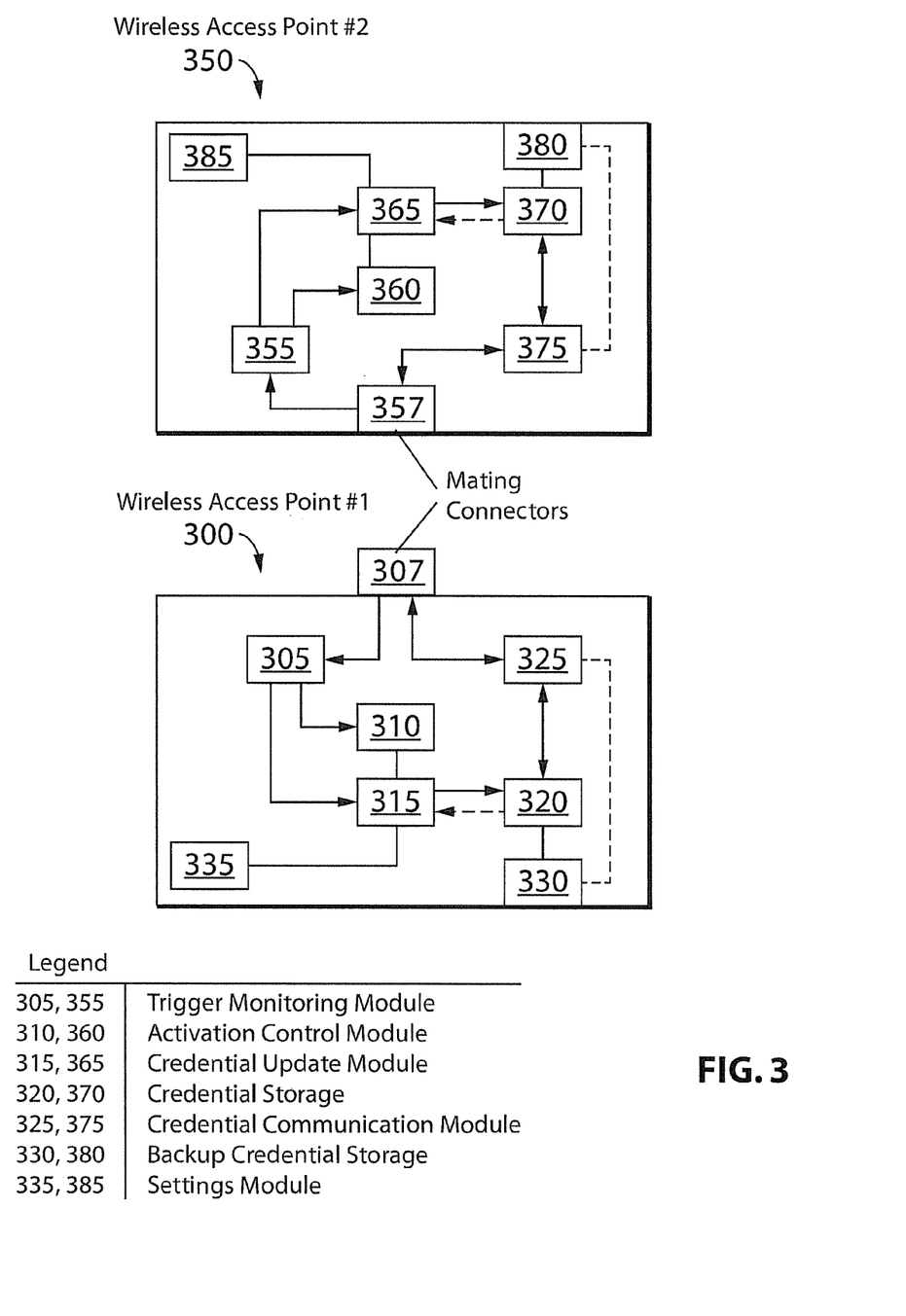
FIG. 3 illustrates a functional block diagram of a system comprising a pair of cooperating wireless access points, in accordance with one embodiment of the technology.

FIG. 3 illustrates a block diagram of a first wireless access point 300, such as a mobile hotspot, and a second wireless access point 350, such as a docking station, in accordance with embodiments of the present technology.

The first wireless access point 300 comprises a trigger monitoring module 305 which is configured to monitor for one or more predetermined trigger events, such as docking and undocking of the first wireless access point 300 to the second wireless access point 350. In some embodiments, the first wireless access point comprises a connector 307 for mating connection to a corresponding connector 357 of the second wireless access point, and the trigger monitoring module 305 may be configured to monitor connectivity of the connector 307 to the corresponding connector 357, and to register a trigger event upon connection or disconnection.

The first wireless access point 300 further comprises a settings module 335, which may be user configurable and which dictates how the first wireless access point responds to trigger events. For example, the settings module may prescribe which of Modes "A" through "D" are to be implemented by the first wireless access point. The settings module may also prescribe other settings and behaviours of the first wireless access point, as described herein.

The first wireless access point 300 further comprises an activation control module 310 which is configured, subject to the state of the settings module 335, to deactivate or reactivate certain functions of the first wireless access point, in response to a trigger event. For example, the activation control module 310 may be configured, in Modes "A" and "B," to deactivate the access point communication facility of the first wireless access point 300 (mobile hotspot) upon a docking trigger event and to reactivate same upon an undocking trigger event. In other modes, the activation control module 310 may not operate or may initiate other activation/deactivation operations.

The first wireless access point 300 further comprises a credential update module 315 which is configured, subject to the state of the settings module 335, to update credential information (possibly including other configuration information) in response to a trigger event. For example, the credential update module 315 may be configured, in Modes "C" and "D," to adjust credentials of the first wireless access point 300 (mobile hotspot) upon a docking trigger event and to restore the previous credentials upon an undocking trigger event. The credentials are stored in one or more memory locations, illustrated here as a credential storage 320. The wireless access point 300 may retrieve credentials from credential storage 320 during operation, for example to support SSID broadcasts, initiation of communication sessions with the wireless access point 300, and the like. Credentials are typically adjusted after being communicated to the second wireless access point 350, so that the original credentials are communicated rather than the adjusted credentials. More generally, order of operations of the various modules of the wireless access point are configured so that appropriate credential information is preserved and routed to appropriate locations. In other modes, the credential update module 315 may not operate or may initiate other activation/deactivation operations. In some embodiments, if the credentials are being adjusted, the old credentials are stored in optional backup credential storage 330. The credentials may later be restored by reading them from the backup credential storage. In some embodiments, the credential update module 315 may read the credential storage 320 and adjust its operations accordingly, for example in order to read the existing SSID and generate a new SSID corresponding to the existing SSID plus an appended suffix.

In various embodiments, the first wireless access point may comprise an operation adjustment module, which is configured to cause the first wireless access point to cease operating using its current credentials settings, such as SSID and password and protocol settings, network settings, subnetwork settings, DHCP settings, device configuration settings, and the like. The operation adjustment module may comprise the activation control module 310 and the credential update module 315, for example, and ceasing operating using current credential settings may comprise deactivation via the activation control module or credential adjustment via the credential update module.

The first wireless access point 300 further comprises a credential communication module 325 which is configured, subject to the state of the settings module 335, to obtain credential information from the credential store 320 (or backup credential store 330 if a backup occurs before transmission) and to transmit the obtained credential information to the second wireless access point 350 in response to a trigger event. In one embodiment, the credential communication module 325 is further configured to receive credential information transmitted from the second wireless access point 350 in response to a trigger event, and to provide same to the credential store 320. This may be the case for example to implement a credential swap.

The second wireless access point 350 comprises a trigger monitoring module 355 which is configured to monitor for one or more predetermined trigger events, such as docking and undocking of the first wireless access point 300 to the second wireless access point 350. In some embodiments, the second wireless access point comprises a connector 357 for mating connection to the corresponding connector 307 of the first wireless access point, and the trigger monitoring module 355 may be configured to monitor connectivity of the connector 357 to the corresponding connector 307, and to register a trigger event upon connection or disconnection.

It is noted that a separate trigger module may not be required in some cases. For example, when one wireless access point receives credentials from the other, activation control and credential update operations may be triggered by receipt of said credentials, rather than detection of a trigger event such as a docking or undocking event. In one embodiment, one wireless access point comprises a trigger module which is responsive to all events, and may transmit credentials or request transmission of credentials, thereby triggering corresponding operation of the other wireless access point. In another embodiment, both wireless access points may include trigger modules which are responsive to the same events, or to different events. For example, one trigger module may be responsive to docking events while the other is responsive to undocking events.

The second wireless access point 350 further comprises a settings module 385, which may be user configurable and which dictates how the second wireless access point responds to trigger events. For example, the settings module may prescribe which of Modes "A" through "D" are to be implemented by the second wireless access point. The settings module may also prescribe other settings and behaviours of the second wireless access point, as described herein.

The second wireless access point 350 further comprises an activation control module 360 which is configured, subject to the state of the settings module 385, to deactivate or reactivate certain functions of the second wireless access point, in response to a trigger event. For example, the activation control module 360 may be configured, in Modes "A" and "C," to deactivate the access point communication facility of the second wireless access point 350 (docking station) upon a docking trigger event and to reactivate same upon an undocking trigger event. In other modes, the activation control module 360 may not operate or may initiate other activation/deactivation operations.

The second wireless access point 350 further comprises a credential update module 365 which is configured, subject to the state of the settings module 385, to update credential information (possibly including other configuration information) in response to a trigger event. For example, the credential update module 365 may be configured, in Modes "B" and "D," to adjust credentials of the second wireless access point 350 (docking station) upon a docking trigger event and to restore the previous credentials upon an undocking trigger event. The credentials are stored in one or more memory locations, illustrated here as credential storage 370. The wireless access point 350 may retrieve credentials from credential storage 370 during operation, for example to support SSID broadcasts, initiation of communication sessions with the wireless access point 350, and the like. Credentials are typically adjusted after being communicated to the first wireless access point 300, if applicable, so that the original credentials are communicated rather than the adjusted credentials. More generally, order of operations of the various modules of the wireless access point are configured so that appropriate credential information is preserved and routed to appropriate locations. In other modes, the credential update module 365 may not operate or may initiate other activation/deactivation operations. In some embodiments, if the credentials are being adjusted, the old credentials are stored in optional backup credential storage 380. The credentials may later be restored by reading them from the backup credential storage. In some embodiments, the credential update module 365 may read the credential storage 370 and adjust its operations accordingly, for example in order to read the existing SSID and generate a new SSID corresponding to the existing SSID plus an appended suffix.

In various embodiments, the second wireless access point may comprise an operation adjustment module, which is configured to cause the second wireless access point to cease operating using its current credentials settings, such as SSID and password and protocol settings, network settings, subnetwork settings, DHCP settings, device configuration settings, and the like. The operation adjustment module may comprise the activation control module 360 and the credential update module 365, for example, and ceasing operating using current credential settings may comprise deactivation via the activation control module or credential adjustment via the credential update module.

The second wireless access point 350 further comprises a credential communication module 375 which is configured, subject to the state of the settings module 385, to receive credential information transmitted from the first wireless access point 300 in response to a trigger event, and to provide same to the credential store 370. In one embodiment, the credential communication module 375 is further configured to obtain credential information from the credential store 370 (or backup credential store 380 if a backup occurs before transmission) and to transmit the obtained credential information to the first wireless access point 300 in response to a trigger event. This may be the case for example to implement a credential swap.

It is noted that the first and second wireless access points 300 and 350 described with respect to FIG. 3 are relatively symmetric and can perform similar functions. However, actual operation may not be symmetric due to settings configuration of the respective settings modules 335 and 385. It is also noted that the first and second wireless access points 300 and 350 may be co-configured, via settings, to cooperatively implement operations such as the Mode "A," "B," "C" and "D" operations described elsewhere herein. Further, other aspects of the first and second wireless access points may not be symmetric, for example when the first wireless access point is a mobile hotspot and the second wireless access point is a docking station, as described elsewhere herein. For example, in some embodiments, only the first wireless access point may act as a link to a broader network.

Additional Features

Various additional features are described below. It is understood that, while the terms "mobile hotspot" and "docking station" are often used in relation to features as detailed below and elsewhere, such features may also apply, as appropriate, to other forms of first and second wireless access points.

In some embodiments, the docking station comprises mechanical means such as adapters for physically accommodating different mobile hotspot designs.

In some embodiments, the docking station maintains no own settings and only operates during the time the mobile hotspot is docked. In these embodiments, when the mobile hotspot is removed from the docking station, the docking station's local network will cease to function. Such embodiments may correspond to an optional functionality which can be enabled or disabled via user configurable settings.

In some embodiments, wired Ethernet ports of the docking station are also shut down when the mobile hotspot is removed. While it could be beneficial to continue to run the device as a dumb switch, this may potentially lead to inconsistent DHCP state. Such embodiments may correspond to an optional functionality which can be enabled or disabled via user configurable settings.

In some embodiments, the docking station provides a persistent local wired and wireless network, whether or not the mobile hotspot is docked. The settings for this network may be derived from the mobile hotspot settings.

In some embodiments, a docking station that has obtained settings from a mobile hotspot will hold on to these settings until a factory reset is performed. This facilitates stability in the docking station's local network, but allows for discrepancy between the mobile hotspot and docking station configurations. The docking station may further be configured to transfer its current settings to the mobile hotspot on request, for example for display purposes.

Routing

In some embodiments, when operating in a stand-alone or undocked mode, the mobile hotspot operates a local network via NAT/Masquerading. The mobile hotspot's local network may operate on an Ethernet bridge over the Wi-Fi and USB CDC-Ether interfaces or the like. In some embodiments, when plugged into the docking station, the mobile hotspot is initially still operating in stand-alone mode. That is, it enumerates on the docking station's USB port as a CDC-Ether device, treating the docking station as another client device.

In some embodiments, the mobile hotspot may have its own local network IP address and a web interface attached to it, and may respond to DHCP requests from the docking station. When the docking station detects the mobile hotspot, it may request the mobile hotspot's current settings and then performs the switch to docked mode. This switch may cause the mobile hotspot to disable its Wi-Fi access point and set the docking station's IP address as a DMZ, routing all WAN packets to the docking station.

In some embodiments, a set of WAN and LAN/Wi-Fi settings are maintained in the mobile hotspot. The docking station's web UI may provide a forwarding function to the mobile hotspot's web UI, as well as password-protected access to advanced mode settings for the docking station.

In some embodiments, the docking station comprises a DNS server which is configured to resolve the host names 'mobile hotspot' and 'docking station' to the appropriate IP addresses to simplify access. DNS requests for otherwise unknown hosts may be forwarded to the DNS servers as specified in the DHCP response.

Protocol Details

In various embodiments, as discussed above, the mobile hotspot is configured to transfer Wi-Fi settings and credentials to the docking station after docking. Since those settings may have been changed while the mobile hotspot was undocked, they may be transferred during every docking operation.

In some embodiments, the mobile hotspot may, when docked, be configured to asynchronously notify the docking station of events, such as WAN state changes.

In some embodiments, a system may be configured to allow for operation of a single mobile hotspot with multiple docking stations and one docking station with multiple mobile hotspots in a user friendly manner. An appropriate level of security may be provided against unauthorised access of the mobile hotspot's or the docking station's credentials.

Dock Protocol

In various embodiments, the protocol used to exchange data between wireless access points, for example between the mobile hotspot and the docking station is AT command based. The AT commands may comprise custom commands configured to support various features as described herein.

In various embodiments, the mobile hotspot is configured to maintain settings for Wi-Fi™, local net, DHCP, and the like. In some embodiments or modes, for example when the docking station only operates when the mobile hotspot is docked, the docking station is not required to manage any settings. Rather, the docking station may accept the mobile hotspot's settings unmodified. In other embodiments or modes, the docking station keeps a derived set of settings. For example, the docking station may inherit some settings from the mobile hotspot unmodified, but may modify other settings in a predetermined and predictable manner. Depending on operating mode, settings may or may not be accessed or configured by a user.

In some embodiments, the docking station's default web UI page only provides some status information, a way of selecting an operation mode, and password protected access to advanced settings. The docking station's web UI may also provide a link to access the mobile hotspot's web interface.

In some embodiments, the docking station is configured to obtain the mobile hotspot's IP address via the 'default route address' within the DHCP response and thus knows where to redirect the web user interface and send the Dock Protocol packets. Since the docking station initiates the Dock Protocol, the mobile hotspot may learn the docking station's IP from the sender address of the first packet, or alternatively make a note of the DHCP address handed to the docking station.

Status Format

In some embodiments, status packets use a name=value format as settings, as in the examples below. Status packets may have partial contents. For example, a WPS button press may trigger a status packet with WPS=1 as the sole content.

A partial list of potential status packets is provided below:
WWAN=1
    Conveys 3G/4G WWAN status and takes on Boolean values. This packet may be sent by the mobile hotspot to reflect the current state of the WWAN link. The docking station may use this information to make WAN routing decisions in advanced mode.

WPS=1
    Conveys whether or not the WPS button on the mobile hotspot was pressed since last status report. For a single button press there may be exactly one (acknowledged) packet with WPS=1. Pushing the button triggers a status message.

dhcpLeases=2
dhcpLease1=192.168.1.100 {starts 2 2008 Aug. 26 04:07:48; ends 3 2008 Aug. 27 04:07:48; tstp 3 2008 Aug. 27 04:07:48; binding state free; hardware ethernet 00:22:33:44:55:66;}
dhcpLease2=192.168.1.101 {starts 0 2008 Sep. 07 23:17:32; ends 1 2008 Sep. 08 23:17:32; tstp 1 2008 Sep. 08 23:17:32; binding state free; hardware ethernet 00:07:08:09:0A:0B;}
    Such status packets convey a DHCP lease table, which may be transferred in both directions. This synchronises the currently active DHCP leases on each side. The mobile hotspot may send the lease table before the docking procedure, The docking station may send it to the mobile hotspot whenever the docking station's lease table changes, such that the mobile hotspot has a current version when it gets undocked.

Cryptography and Security

In various embodiments, the first wireless access point (mobile hotspot) settings contain sensitive information to be protected from unauthorised access. This includes access via a suitably prepared laptop or 'hostile' docking station.

In some embodiments, some settings may be identified as not required for the docking station's operation (WAN access, SIM PIN, etc.), and these settings are not provided to the docking station.

In some embodiments, a common secret key, shared between all docking stations and mobile hotspots is used to facilitate an implicit trust between all such devices. The key may be stored within all devices at production time and will be somewhat protected from reverse engineering by virtue of being embedded inside a binary program.

In some embodiments, an encryption key is used as a common shared secret between all mobile hotspots and all docking stations.

In some embodiments, encryption makes use of the 'Salt' and 'Constant' fields in the packet header. These fields are 0 for any unencrypted packets. The 'Salt' is a random number, which is generated for each packet and appended to the key during encryption/decryption. It ensures that identical payload will not yield predictable cypher text. For unencrypted packets this field is always 0, for encrypted packets this field may be zero (at a probability of $2^{64}:1$). The 'Constant' is simply an agreed constant number which is used to detect an incorrect key. The Constant is encrypted, just like the payload. Thus, by checking it after decryption, the correct decryption may be validated. This field is ignored for unencrypted packets and should be set to 0. The main purpose of the Constant field is for the mobile hotspot to quickly check the validity of the decrypted packets without having to validate the data area for correctness. Incorrectly encrypted packets are dropped without response.

In various embodiments, one of several dedicated libraries that provide suitable encryption algorithms (e.g. libssl) may be utilized for providing encryption in the present technology. Encryption libraries may employ an MD5 cypher or the like, for example.

Mass Storage/SD Card Handling

In some embodiments, mobile hotspot devices integrate a micro SD™ card slot. In some embodiments, this slot is accessible by presenting the micro SD™ card as a USB mass storage device, using a composite USB device with two interfaces (CDC-Ethernet and Mass Storage). In some embodiments, this slot is accessible by presenting the micro SD™ card as a SAMBA/CIFS network drive. To maintain a consistent interface, the drive is also mounted internally and then re-exported by the docking station. In both cases, the mobile hotspot's micro SD™ card will be available to the docking station's local network via a SAMBA/CIFS interface. By default, the docking station's shared network drive will allow 'guest' access, without password, unless the mobile hotspot has provided SAMBA/CIFS credentials.

In some embodiments, should the mobile hotspot provide SAMBA/CIFS credentials, the docking station may use them for its own share in one mode, for example Mode "A." In another mode, for example Mode "B," the docking station may be configured to remember the first credentials it has seen, or the docking station may allow arbitrary credentials.

In some embodiments, since the mobile hotspot is also visible in the network under its own IP address, users may opt to access the mobile hotspot's shared drives directly. To this end, the docking station may be configured to provide a DNS entry for the mobile hotspot and answer to NetBIOS requests on behalf of the mobile hotspot.

In some embodiments and modes, the docking station may be configured to continue to export the network share when the mobile hotspot is removed. In some modes, such as Mode "B," the share will appear read-only and empty. It may contain a dummy file with a file name indicating that storage is inaccessible. In transparent mode all networking is off.

In some embodiments, the docking station may export additional network drives corresponding to USB Mass Storage devices plugged into the docking station's other USB connectors.

In some embodiments, the docking station is configured to mount the exported USB Mass Storage drive to a suitable internal mount point. To avoid file system consistency issues, the drive may be operated in synchronous mode, where write operations only return after the data is committed to storage.

In some embodiments, micro SD™ cards are formatted using a variant of the FAT file system. In other embodiments, micro SD™ cards are formatted using NTFS. The docking station may be configured to integrate support for these file systems, as appropriate.

In some embodiments, for mobile hotspots that are providing their own SAMBA/CIFS file system export, the docking station may be configured to mount the mobile hotspot's network drive to a suitable internal mount point. It may then be configured to re-export the file system to the local network.

In this case, the mobile hotspot may be configured to include network share access credentials into the settings packets. In transparent and SOHO modes, the docking station may be configured to apply those settings to the docking station's own representation of that shared drive.

It will be appreciated that, although specific embodiments of the technology have been described herein for purposes of illustration, various modifications may be made without departing from the spirit and scope of the technology. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Acts associated with the method described herein can be implemented as coded instructions in plural computer program products. For example, a first portion of the method may be performed using one computing device, and a second portion of the method may be performed using another computing device, server, or the like. In this case, each computer program product is a computer-readable medium upon which software code is recorded to execute appropriate portions of the method when a computer program product is loaded into memory and executed on the microprocessor of a computing device.

Further, each step of the method may be executed on any computing device, such as a personal computer, server, PDA, or the like and pursuant to one or more, or a part of one or more, program elements, modules or objects generated from any programming language, such as C++, Java, PL/1, or the like. In addition, each step, or a file or object or the like implementing each said step, may be executed by special purpose hardware or a circuit module designed for that purpose.

It is obvious that the foregoing embodiments of the technology are examples and can be varied in many ways. Such present or future variations are not to be regarded as a departure from the spirit and scope of the technology, and all such modifications as would be obvious to one skilled in the art are intended to be included within the scope of the following claims.

We claim:

1. A system comprising a first wireless access point and a second wireless access point, each of the wireless access points can communicate with one or more wireless devices via a local wireless network, the first wireless access point initially utilizing predetermined identity and authentication credentials, the system configured, in response to a predetermined trigger event indicative of docking or undocking of the first wireless access point and the second access point, or proximity or loss of proximity within a predetermined distance between the first wireless access point and the second access point, to transfer the identity and authentication credentials from the first wireless access point to the second wireless access point via corresponding communication electronics thereof, said transfer being directed by coordinated operation of microprocessors of the first and second wireless access points, wherein upon transferring the identity and authentication credentials, the first wireless access point is configured, by operation of the microprocessor thereof, to cease using the identity and authentication credentials, and the second wireless access point is configured, by operation of the microprocessor thereof, to begin using the identity and authentication credentials, wherein the identity and authentication credentials are utilized, by the wireless access points, for establishing said wireless communication connectivity with those of the one or more wireless devices which specify said identity and authorization credentials in association with a connection request, wherein ceasing using the identity and authentication credentials comprises:
  ceasing local wireless networking operation of the first wireless access point; or
  adjusting said identity and authentication credentials and continuing local wireless networking operation of the first wireless access point using said adjusted identity and authentication credentials.

2. The system according to claim 1, wherein the first wireless access point is a mobile hotspot and the second wireless access point is a docking station, wherein the mobile hotspot is a wireless access point which facilitates access to a broader network and is coupled to the broader network via a wireless connection, and wherein the docking station is configured for wired connection to the mobile hotspot for at least battery charging of the mobile hotspot.

3. The system according to claim 1, wherein the identity and authentication credentials comprise one or more of: Service Set Identifier (SSID), encryption protocol, password, and device configuration settings.

4. The system according to claim 1, wherein the identity and authentication credentials further comprise one or more of: network settings, subnetwork settings, and Dynamic Host Configuration Protocol (DHCP) settings.

5. The system according to claim 2, wherein the predetermined trigger event corresponds to docking or undocking of the mobile hotspot to the docking station.

6. The system according to claim 1, the system further configured, in response to a second predetermined trigger event indicative of docking or undocking of the first wireless access point and the second access point, or proximity or loss of proximity within the predetermined distance between the first wireless access point and the second access point, to transfer the identity and authentication credentials from the second wireless access point to the first wireless access point, wherein upon transferring the identity and authentication credentials, the second wireless access point is configured to cease using the identity and authentication credentials, and the first wireless access point is configured to resume using the identity and authentication credentials.

7. The system according to claim 2, wherein the mobile hotspot provides access to. a broader network, said access provided to the one or more wireless devices in communication with either one of the mobile hotspot or the docking station.

8. A system comprising a first wireless access point and a second wireless access point, each of the wireless access points can communicate with one or more wireless devices via a local wireless network, a) the first wireless access point comprising:
i) a first trigger monitoring module configured to monitor for one or more predetermined trigger events indicative of docking or undocking of the first wireless access point and the second access point, or proximity or loss of proximity within a predetermined distance between the first wireless access point and the second access point;
ii) a first operation adjustment module configured to cause the first wireless access point to cease using a currently used set of identity and authentication credentials in operation upon detection of a first one of the predetermined trigger events, wherein the first operation adjustment module comprises a first microprocessor, wherein ceasing using the identity and authentication credentials comprises:
ceasing local wireless networking operation of the first wireless access point; or
adjusting said identity and authentication credentials and continuing local wireless networking operation of the first wireless access point using said adjusted identity and authentication credentials; and
iii) a first credential communication module configured to transmit said set of identity and authentication credentials to the second wireless access point upon detection of the first one of the predetermined trigger events, wherein the first credential communication module comprises the first microprocessor and a first set of electronics configured for communication; and
b) the second wireless access point comprising:
i) a second credential communication module configured to receive said set of identity and authentication credentials from the first credential communication module, wherein the second credential communication module comprises a second microprocessor and a second set of electronics configured for communication; and
ii) a second operation adjustment module configured to cause the second wireless access point to begin using a currently used said set of identity and authentication credentials in operation upon receipt of said set of identity and authentication credentials, wherein the second operation adjustment module comprises the second microprocessor, wherein the set of identity and authentication credentials are utilized, by the wireless access points, for establishing said wireless communication connectivity with those of the one or more wireless devices which specify said identity and authorization credentials in association with a connection request.

9. The system according to claim 8, wherein the second wireless access point further comprises a second trigger monitoring module configured to monitor for one or more second predetermined trigger events indicative of docking or undocking of the first wireless access point and the second access point, or proximity or loss of proximity within the predetermined distance between the first wireless access point and the second access point.

10. A method for operating a first wireless access point in conjunction with a second wireless access point, each of the wireless access points can communicate with one or more wireless devices via a local wireless network, the first wireless access point initially utilizing predetermined identity and authentication credentials, the method comprising:
a) detecting a predetermined trigger event at one or both of the first wireless access point and the second wireless access point, said trigger event indicative of docking or undocking of the first wireless access point and the second access point, or proximity or loss of proximity within a predetermined distance between the first wireless access point and the second access point;
b) in response to the predetermined trigger event, transferring the identity and authentication credentials from the first wireless access point to the second wireless access point; and
c) upon transferring the identity and authentication credentials, ceasing use of the identity and authentication credentials by the first wireless access point and beginning use of the identity and authentication credentials by the second wireless access point, wherein ceasing using the identity and authentication credentials comprises:
ceasing local wireless networking operation of the first wireless access point; or
adjusting said identity and authentication credentials and continuing local wireless networking operation of the first wireless access point using said adjusted identity and authentication credentials;
wherein the identity and authentication credentials are utilized, by the wireless access points, for establishing said wireless communication connectivity with those of the one or more wireless devices which specify said identity and authorization credentials in association with a connection request.

11. The method according to claim 10, wherein the identity and authentication credentials comprise one or more of: Service Set Identifier (SSID}, encryption protocol, password, and device configuration settings.

12. The method according to claim 10, wherein the identity and authentication credentials further comprise one or more of: network settings, subnetwork settings, and Dynamic Host Configuration Protocol (DHCP} settings.

13. The method according to claim 10, wherein the first wireless access point is a mobile hotspot and the second wireless access point is a docking station, and
wherein the predetermined trigger event corresponds to docking or undocking of the mobile hotspot to the docking station, wherein the mobile hotspot is a wireless access point which facilitates access to a broader network and is coupled to the broader network via a wireless connection, and wherein the docking station is configured for wired connection to the mobile hotspot for at least battery charging of the mobile hotspot.

14. The method according to claim 10, further comprising, in response to a second predetermined trigger event indicative of docking or undocking of the first wireless access point and the second access point, or proximity or loss of proximity within the predetermined distance between the first wireless access point and the second access point, transferring the identity and authentication credentials from the second wireless access point to the first wireless access point, wherein upon transferring the identity and authentication credentials, the second wireless access point is configured to cease using the identity and authentication credentials, and the first wireless access point is configured to resume using the identity and authentication credentials.

15. The method according to claim 10, wherein the first wireless access point is a mobile hotspot and the second wireless access point is a docking station, and
wherein the mobile hotspot provides access to a broader network, said access provided to the one or more wireless devices in communication with either one of the mobile hotspot or the docking station,
wherein the mobile hotspot is a wireless access point which facilitates access to a broader network and is coupled to the broader network via a wireless connection, and
wherein the docking station is configured for wired connection to the mobile hotspot for at least battery charging of the mobile hotspot.

16. A computer-program product embedded on a non-transitory computer readable medium, the computer program product comprising code, which when loaded into memory and executed on an associated processor, is adapted to direct a set of operations of a first wireless access point and a second wireless access point, each of the wireless access points can communicate with one or more wireless devices via a local wireless network, the first wireless access point initially utilizing predetermined identity and authentication credentials, the set of operations comprising:
a) detecting a predetermined trigger event at one or both of the first wireless access point and the second wireless access point, said trigger event indicative of docking or undocking of the first wireless access point and the second access point, or proximity or loss of proximity within a predetermined distance between the first wireless access point and the second access point;
b) in response to a predetermined trigger event, transferring the identity and authentication credentials from the first wireless access point to the second wireless access point; and
c) upon transferring the identity and authentication credentials, ceasing use of the identity and authentication credentials by the first wireless access point and beginning use of the identity and authentication credentials by the second wireless access point, wherein the identity and authentication credentials are utilized, by the wireless access points, for establishing said wireless communication connectivity with those of the one or more wireless devices which specify said identity and authorization credentials in association with a connection request,
wherein ceasing using the identity and authentication credentials comprises:
ceasing local wireless networking operation of the first wireless access point; or
adjusting said identity and authentication credentials and continuing local wireless networking operation of the first wireless access point using said adjusted identity and authentication credentials.

* * * * *